Patented Jan. 14, 1941

2,228,789

UNITED STATES PATENT OFFICE 2,228,789

PURIFICATION OF VALUABLE HYDROCARBONS

Frank J. Soday, Upper Darby, Pa., assignor to The United Gas Improvement Company, a corporation of Pennsylvania No Drawing. Application May 28, 1938, Serial No. 210,745

7 Claims. (Cl. 260—668)

This invention pertains generally to the purification of hydrocarbons, and pertains particularly to the purification of resin-forming unsaturated hydrocarbons obtained from (1) gas condensates and tar oils produced in the manufacture of artificial gas; (2) cracked petroleum products; (3) coal tar distillates; and (4) synthetic sources such as processes for the manufacture of synthetic styrene.

The invention pertains more particularly to the purification of crude fractions of resin-forming unsaturated hydrocarbons derived from light oil such as crude styrene, crude indene, crude methyl styrenes, cyclopentadiene, isobutylene, isoprene, butadiene, piperylene, and the like.

In the various processes for the manufacture of artificial gas such as oil gas, carburetted water gas, or coal gas, considerable quantities of tar are produced, and the gas contains substantial quantities of other readily condensable materials.

The latter condensates as well as the distillate from the tar are generally known as light oil and are sources for many resin-forming unsaturated hydrocarbons such as indene, styrene, methyl styrene, cyclopentadiene, isobutylene, isoprene, piperylene, butadiene, etc.

With ordinary methods of fractional distillation as now practiced, it is impossible to separate the resin-forming unsaturated hydrocarbons in a substantially pure state because of the presence of other materials which apparently are either of similar boiling point or are capable of forming azeotropic mixtures with the desired hydrocarbon. Furthermore, many of these materials are polymerizable with heat which adds to distillation difficulties.

For instance, a typical styrene fraction obtained by ordinary distillation processes will contain hardly more than 50% styrene, and a typical indene fraction will contain hardly more than 80% indene.

Such fractions as well as those of lower and higher concentration are generally suitable for the manufacture of synthetic resins by polymerization except that the resulting resins are very often too inferior with respect to color, color stability, electrical resistance, molding properties, freedom from crazing, thermal stability, melting point, specific viscosity, molecular weight and mechanical strength as to be of any considerable value.

I find that these deficiencies are generally traceable to the presence during the polymerization of certain contaminating materials.

While I have not as yet exactly determined the character of these impurities, experimental evidence indicates that they may be classified in certain specific groups.

For example, a typical styrene fraction obtained from light oil was analyzed and found to contain approximately 0.1% sulfur. This indicates that crude styrene fractions obtained from the above sources contain a relatively large quantity of sulfur containing materials such as mercaptans, disulfides, or derivatives of thiophene and related compounds.

Another portion was treated with a mercurating solution which resulted in the production of a copious precipitate. Precipitates obtained with different portions of the starting material varied in color from a faint yellow to a light brown. This indicates, among other things, the presence of superaromatic compounds such as substituted thiophene and thiophene homologues.

The treatment of various light oil fractions with ammoniacal cuprous chloride resulted in the formation of a heavy yellow precipitate. This indicates the presence of acetylenic compounds such as phenyl acetylene.

Similar tests made with pure styrene diluted with xylene to the same concentration as the crude styrene fractions treated above gave results which were negative in each case.

Other types of impurities are doubtless present also, although specific tests have not as yet been devised for their detection. Among these types of impurities may be included oxygenated compounds, organic peroxides and oxides, organic per acids, aldehydes, amines, and other reactive classes of compounds.

As indicated above it is difficult, if not impossible, to prepare a commercial grade of resin, such as polystyrene, from crude light oil fractions unless at least some of the contaminating impurities are removed.

While the exact influence of these contaminating materials is not known it may be pointed out that they may act (1) as accelerators resulting in the production of polystyrene of relatively poor quality under polymerizing conditions which would normally result in the production of a good grade of polystyrene; (2) as inhibitors reducing the quantity of polystyrene obtained under normal polymerizing conditions; and/or (3) they may take part in the reaction and become an integral part of the resin molecule.

The presence of contaminating impurities in the polymer molecule would undoubtedly weaken it, causing the resin to be less stable to heat and to readily decompose with the formation of undesired color bodies.

The highly reactive nature of the resin-forming unsaturated hydrocarbons makes it extremely difficult to remove the contaminating impurities.

For instance, customary methods for the removal of impurities, such as sulfur compounds, diolefines and acetylenes, from cracked distillates in the manufacture of motor fuels removes most, if not all, of any styrene present.

It seems probable that any material which is sufficiently reactive to be capable of use for the purification of the crude resin-forming unsaturated hydrocarbons will also react with them.

For instance, while mixtures of boric acid and sulfuric acid may be used to refine hydrocarbon distillates obtained in the cracking of petroleum oil, for instance, in the production of gasoline, the procedure when applied to crude styrene solutions results in large losses in styrene.

I have found, however, that, by a proper choice of conditions such as temperature, time of contact, method of application and so forth, the various reactions may be made to take place at different rates with the result that practically all of the undesired contaminating materials may be removed without a considerable loss in the desired hydrocarbon. The successful application of this process depends, in large measure not only upon the use of boric acid, or of compounds in which boron is present, in the acid mixture to reduce the sulfonating and polymerizing action of the sulfuric acid upon the olefines, diolefines and aromatic hydrocarbons present in the fraction or material to be refined, but also upon the use of proper temperatures.

The following example will serve to illustrate the invention:

Example I

A 500 cubic centimeter (442.2 grams) sample of a typical crude styrene cut obtained from the fractionation of light oil and containing 33.3 grams of styrene per 100 cubic centimeters was agitated for 4 minutes with 25 cubic centimenters of a 70% solution of sulfuric acid containing 2.75% of boric acid ($H_3BO_3$) at a temperature of 20° C. The mixture was then allowed to stand for 4 minutes during which time a sludge settled out and was removed.

An additional 25 cubic centimeters of the foregoing solution of sulfuric acid was then added and the mixture again agitated for 4 minutes. During a settling time of 4 minutes sludge was intermittently removed.

The sample was then treated with 10 cubic centimeters of a 20% aqueous solution of sodium hydroxide with moderate stirring. After permitting the materials to settle the aqueous layer was removed.

The sample was now washed ten successive times with 10 cubic centimeters of water. The last washings were neutral to litmus which indicated complete removal of acid and alkaline residues.

The total treating loss up to this point was only 0.7% by weight of the starting material.

The refined sample of crude styrene was now dried for a period of 24 hours over anhydrous sodium sulfate.

The drying loss was 2.6% by weight of the starting material. Although this loss is not excessive, I wish to point out that it was due almost entirely to mechanical absorption by the drying agent and that the lost material might be reclaimed by washing the sodium sulfate with a suitable solvent.

The dried material was then distilled in vacuum. This occasioned an additional loss of 4.0% of the original charge.

The crude styrene was now ready for polymerization.

It is to be noted that despite the reactive nature of the material being treated the total treating loss was only 7.3% by weight of the starting material, or 12.4% by weight of the styrene contained in the starting material. Most of these losses were of a mechanical nature and are, therefore, susceptible to considerable reduction, particularly in large scale operations.

The refined styrene solution had a color on the well known Gardner color scale of 0.00 (water white) as compared to a color of 2.5 shown by the starting material.

A sample of the refined styrene solution was subjected to polymerization for 4 days at a temperature of 145° C. in a nitrogen atmosphere.

The resin yield was 31.4 grams per 100 cubic centimeters of refined solution. The starting material itself contained only 33.3 grams of styrene per 100 cubic centimeters of crude solution.

Another sample of the refined styrene solution and a sample of the starting material were each subjected to identical polymerizing conditions, namely heating for a 10 day period at 100° C. in an atmosphere of nitrogen.

The resin obtained from the refined material had a color of 0.6 on the Gardner color scale, whereas the resin obtained from the unrefined material had a color of 2.0 on the Gardner color scale.

A sample of each portion of resin was subjected to molding at a temperature of 200° C. and a pressure of 2000 pounds per square inch. The molded refined material had a color of 1.0 on the Gardner color scale, whereas the molded unrefined material had a color of 2.4 on the Gardner color scale.

Furthermore, the refined resin possesses unusual color stability as shown by the following test.

A sample of resin obtained from the refined material and a sample of resin obtained from the unrefined material were each heated for 2 days in an atmosphere of nitrogen at a temperature of 145° C.

At the end of this rather severe treatment the refined resin had a color of 7.5 on the Gardner color scale, whereas the unrefined resin had a color of 12.0 on the Gardner color scale.

The melting point of samples of refined resin was 182° C., whereas the melting point of samples of unrefined resin was 154° C.

Tests also show that the refined resin possesses a much better mechanical strength than the unrefined resin, that its molding properties are considerably improved and that it is more uniform in texture and appearance.

While solutions of sulfuric acid of any desired strength may be employed, I prefer to use sulfuric acid of at least 50% strength, and up to and including 95% strength. In fact, 100% acid may be employed, particularly if it is free of dissolved $SO_2$ and $SO_3$. On the other hand acid of lower concentration may be employed, particularly in the case of more concentrated solutions of olefines and diolefines.

I find that solutions of sulfuric acid of 60% to 80% concentration are very satisfactory. 70% acid will be found excellent in most cases.

Preferably, the acid solution should contain at least 0.5% by weight of boric acid. Ordinarily hardly more than 40% by weight is necessary, although higher concentrations may be employed and may be preferred in certain cases.

Boron salts and other compounds of boron may be added to or substituted for boric acid. These compounds may be generally classified as retarding agents.

Although any suitable proportion of acid solution may be employed, I prefer to use from 0.2% to 50% by volume based upon the material being treated.

I find that from 2% to 10% of acid solution by volume of the material under treatment gives very satisfactory results.

If desired suitable additions may be made to the acid solution.

Examples of materials which might be added to the acid solution are (1) retarding agents, other than compounds of boron, which have for their specific purpose a reduction in the effect of the acid upon the olefines diolefines, and aromatic hydrocarbons present in the fraction, such as alkali metal sulfates or other salts and alkaline earth sulfates or other salts; (2) oxidizing agents, whose function is to increase the refining action of the acid solution, such as $KMnO_4$, $NaMnO_4$, $K_2Cr_2O_7$, $KCrO_4$, $Na_2Cr_2O_7$, $NaCrO_4$, chromic acid, ferric oxide, lead oxide, and the like; (3) reducing agents, the function of which is to remove highly reactive impurities by means of nascent hydrogen, such as zinc dust, iron filings, aluminum powder, magnesium powder, tin dust, nickel powder, and cadmium powder; and (4) inhibitors, the function of which is to inhibit the polymerization of the unsaturated hydrocarbons during the treating process, such as p-tertiary butyl catechol, 2-4 diaminophenol dihydrochloride, 2-amino-5 hydroxytoluene, p-benzyl aminophenol, and p-methylamino-phenol sulfate.

Any desired combination of (1), (2), (3) and (4) of the preceding paragraph may be added, although perhaps in most cases (2) and (3) would not be combined since one tends to offset the other.

Acid mixtures of which sulfuric and boric acids are constituents may be used with excellent results. Examples of acids, and acid anhydrides, which may be mixed with the sulfuric acid solution are acetic acid, a sulfonic acid such as benzene, toluene, xylene, and/or ethyl benzene sulfonic acid and the like, phosphoric acids, phosphorous acids, $P_2O_5$, and $P_2O_3$.

While any suitable temperature may be employed during the various treating steps, I prefer to maintain the temperature between $-40°$ C. and $75°$ C.

Temperatures between approximately $-10°$ C. and $30°$ C. are very satisfactory. However, the temperature maintained during the treatment should decrease with increase in acid concentration to avoid any considerable permanent discoloration of the hydrocarbon due to the strength of the reagent. For instance, when using 100% acid the temperature should be at least as low as approximately $0°$ C. On the other hand, when the temperature is in the neighborhood of $75°$ C. the acid should be relatively dilute. Permanent discoloration shows up after neutralization and washing with water since neutralization and water washing usually remove most of the temporary discoloration due to the treatment. Distillation, clay treating and/or other refining steps will remove the rest of the temporary discoloration. On the other hand, the temperature should not be so low as to render the reagent inactive. Generally speaking, active acid becomes discolored during the treatment.

Unless certain precautions are observed the addition of the neutralizing agent to the acid washed material may result in the formation of an emulsion. I, therefore, prefer to add the neutralizing solution slowly and with moderate agitation, although alternate procedures may be employed.

Such alternate procedures include (a) the removal of the acid addition products by various solvents such as alcohol or glycerol before the alkali wash; (b) the addition of certain materials to the alkali wash such as liquid rosin, petroleum carboxylic acids, ethyl alcohol, oleic acid, and naphthenic acids; and (c) the addition of various emulsion inhibiting agents to the alkali wash such as aldehydes.

However, emulsions if formed can generally be broken by the addition of an absorbent material such as fuller's earth followed by filtering, or by the use of other suitable methods, such as electrical precipitation, the addition of various inorganic salts to the emulsion, and the like.

Any other suitable neutralizing agent may be employed for the removal of excess acid and acid residues from the material under treatment. Examples of such neutralizing agents are lime, $Na_2CO_3$, KOH, ammonia, fuller's earth, clay and activated carbon.

These neutralizing agents may be applied in the solid form, or in the form of solutions in water or other solvent. They may be used alone, or in combination with one or more other neutralizing agents, in which case they may be added to the treated solution together, or successively. For example, the acid-treated solution can be treated with clay to remove the major portion of the acid and sludge present, the clay and adsorbed materials removed by filtration or by other suitable means, and solid $Na_2CO_3$ added to the solution to remove any residual acid or sludge present. Incidentally, this treatment usually serves to completely remove all of the water present in the treated solution, rendering unnecessary any further drying operations.

If desired, insert solvents such as petroleum naphtha and carbon tetrachloride may be added to the material under treatment either before or during the treating process.

Such materials are usually added to reduce the loss of olefines and diolefines present, although they may have other functions.

The crude fractions which may be treated by my process may have any reasonable boiling range.

For instance, crude styrene fractions may have a boiling range of from $125°$ C. to $165°$ C. or wider, although I prefer to use crude styrene fractions with boiling ranges which do not greatly exceed $140°$ C. to $150°$ C.

Excellent results are obtained when using crude styrene fractions with boiling ranges chiefly between approximately $142°$ C. to $148°$ C.

What has just been said with respect to the boiling ranges of crude styrene fractions applies comparably to fractions of other unsaturated hydrocarbons.

For instance, a valuable methyl styrene fraction composed largely of para-methyl and meta-methyl styrenes is obtained from light oil when at least approximately 80% of the cut boils between $167°$ C. and $175°$ C. Likewise, a valuable indene fraction is obtained from light oil when at least approximately 80% boils between $177°$ C. and $186°$ C.

In general, and with all other conditions unchanged, the extent of purification will, generally speaking, be directly proportional to the narrowness in boiling range of the starting material.

Results comparable to those particularly set forth above in connection with styrene are obtained upon the polymerization of other light oil fractions such as methyl styrene and indene treated by my process.

As an example a purified methyl styrene fraction may be polymerized by subjecting it to a temperature of 80° C. for a period of 8 days, followed by removal of unpolymerized material by vacuum distillation. The polymerized material has a color of 0.0 (water white) on the Gardner color scale.

Also as an example, a purified indene fraction may be polymerized by adding it to a suspension of 2.0% by weight of ferric chloride in toluene, followed by stirring for a period of three hours. The catalyst is then hydrolyzed by the addition of the theoretical amount of sodium hydroxide in the form of a 20% solution. The mixture then is filtered and the unpolymerized material removed by steam distillation. The polymerized material has a color of 4.0 on the Gardner color scale.

Unwashed indene polymerized in a similar manner has a color of 8.0 on the Gardner color scale.

A crude styrene solution containing any quantity of styrene such as from 1.0% to 99% may be refined by my method.

Excellent results are obtained with styrene solutions containing from 10% to 80% styrene.

Comparable concentrations apply to the other unsaturated hydrocarbons.

Further examples of such other unsaturated hydrocarbons are the other olefins and diolefines obtained from light oil, from drip oil (from gas mains), from coal tar, from cracked distillates, and from synthetic or other sources.

Contact between the material undergoing treatment and the treating material, namely acid, alkali (or other neutralizing agent), or water may be accomplished by any means known in the art.

For instance any suitable batch, multiple batch, batch countercurrent, continuous countercurrent or continuous concurrent contacting apparatus and method may be employed.

In this respect reference is had particularly to the large number of processes and apparatus for leaching generally, for bringing mineral oil into contact with a chemical reagent, for the solvent extraction of mineral oils, etc., which may be adapted for carrying out the invention.

In certain cases it may be advisable to treat the unsaturated hydrocarbon, or fractions containing the unsaturated hydrocarbons with successive portions of the acid in order to effect a more thorough purification of the hydrocarbon solution, or a more economical utilization of the acid mixture, or both. The batchwise addition of the acid mixture may be made with or without the removal of a portion or all of the acid and acid sludge from the preceding application and with or without additional refining steps, such as neutralization, drying, fractionation, and/or crystallization between successive batchwise additions of the acid refining agent.

In certain cases it may be found to be desirable to contact fresh charges of the unsaturated hydrocarbon fractions with spent acid and/or acid sludge and residues from the preceding refining step in order to secure greater economy in the use of the acid and/or a more thorough purification of the hydrocarbon fractions. The hydrocarbon fraction so treated may then be contacted with additional quantities of fresh acid, either with or without previously removing the acid sludge from the initial treatment and with or without additional refining steps, such as neutralization, drying, fractionation and/or distillation, and the refining operation completed in the normal manner, namely by separation of the respective layers, followed by neutralizing, drying, and/or distilling.

The treated material, of course, lends itself to further purification, should this be desired. Such further purification may be by contact with clay, with activated carbon, or with diatomaceous earth at any suitable temperature, or by distillation at any desired pressure, or by partial polymerization followed by removal of undesirable constituents, or by fractional crystallization, or by other physical or chemical means.

By operating my process more drastically it may be employed to completely remove the olefines and diolefines present in the material undergoing treatment leaving the aromatic hydrocarbons, naphthenes and/or paraffins unchanged. Special solvents may be prepared in this manner.

Other variations will become apparent to persons skilled in the art upon becoming familiar with this invention.

The treating process as outlined in the example listed may be greatly simplified in most cases. For example, I find that styrene solutions may be refined in a satisfactory manner by treatment with the acid solution, followed by the application of clay or activated carbon, either alone or in conjunction with other neutralizing agents, such as sodium carbonate or lime, and the removal of all solid material from the treated solution by filtration or by other suitable means. No further treatment is usually necessary.

The term "permanent color" as used in the claims is intended to mean color which remains after the removal of acid and acid reaction products such as by neutralization and water washing followed by distillation.

Also the term "a compound of boron in quantity equivalent to at least 0.5% by weight of boric acid" as used in the claims is intended to embrace boric acid itself.

It is, therefore, to be understood that the above examples are by way of illustration and that changes, omissions, additions, substitutions, and/or modifications might be made within the scope of the claims without departing from the spirit of the invention which is intended to be limited only as required by the prior art.

I claim:

1. A process for the purification of the resin-forming unsaturated hydrocarbon content of a light oil fraction which comprises contacting said light oil fraction in the liquid phase with a reagent comprising sulfuric acid at least 50% in concentration but free from any appreciable uncombined sulfur dioxide and sulfur trioxide and containing a compound of boron in quantity equivalent to at least 0.5% by weight of boric acid, said contact of said fraction and said reagent taking place at a temperature below 75° C. and under conditions including acid concentration and temperature sufficiently drastic to remove color forming bodies but insufficiently drastic to polymerize a large part of said resin-forming unsaturated hydrocarbon content and insufficiently drastic to add any appreciable permanent color to said fraction, and removing said reagent from said fraction.

2. A process for preparing a refined cut of a resin-forming unsaturated light oil hydrocarbon which is highly resistant to color formation when subjected to conditions for the polymerization of said unsaturated hydrocarbon which comprises subjecting light oil to fractional distillation to obtain a cut of said unsaturated hydrocarbon, treating said cut in the liquid phase with from 0.2% to 50% by volume of sulfuric acid free from any appreciable uncombined sulfur dioxide and sulfur trioxide, said acid being at least 50% in concentration and containing a compound of boron in quantity equivalent to at least 0.5% by weight of boric acid, said treatment taking place at a temperature below 75° C. and under conditions including acid concentration and temperature sufficiently drastic to remove color forming bodies but insufficiently drastic to polymerize a large part of said resin-forming unsaturated hydrocarbon and insufficiently drastic to add any appreciable permanent color to said cut, and removing said reagent from said cut.

3. In a process for the purification of a resin-forming unsaturated hydrocarbon derived from light oil, the steps of treating said hydrocarbon in the liquid phase with sulfuric acid which is free from any appreciable uncombined sulfur dioxide and sulfur trioxide and which contains a compound of boron in quantity equivalent to at least 0.5% by weight of boric acid, said treatment taking place at a temperature below 75° C. and under conditions including acid concentration and temperature sufficiently drastic to remove color forming bodies but insufficiently drastic to polymerize a large part of said resin-forming unsaturated hydrocarbon and insufficiently drastic to add any appreciable permanent color to said hydrocarbon, and removing said reagent from said hydrocarbon.

4. A process for preparing a refined solution of a resin-forming unsaturated light oil hydrocarbon which is highly resistant to color formation when subjected to conditions for the polymerization of said unsaturated hydrocarbon which comprises subjecting light oil produced in the manufacture of artificial gas to fractional distillation to obtain a relatively close cut of said unsaturated hydrocarbon, treating said cut with from 2% to 10% by volume of sulfuric acid containing a compound of boron, said acid being from 60% to 80% in concentration and said compound of boron being present in concentration equivalent to from 0.5% to 40% by weight of boric acid, said treatment taking place at a temperature between —10° C. and 30° C. but sufficiently low to avoid adding any appreciable permanent color to said hydrocarbon due to the strength of said acid, and then removing residual acid from said cut.

5. A process for preparing a refined styrene cut which comprises subjecting light oil produced in the manufacture of artificial gas to fractional distillation to obtain a cut the preponderate part of which boils between 142° C. and 148° C., treating said cut from 2% to 10% by volume of a solution of sulfuric acid and boric acid, said sulfuric acid being from 60% to 80% in concentration, and said boric acid from 0.5% to 40% in concentration, said treatment taking place at a temperature between —10° C. and 30° C. but sufficiently low to avoid adding any appreciable permanent color to said hydrocarbon due to the strength of said acid, and removing residual acid from said styrene cut.

6. A process for preparing a refined methyl styrene cut which comprises subjecting light oil produced in the manufacture of artificial gas to fractional distillation to obtain a cut the preponderate part of which boils between 167° C. and 175° C., treating said cut with from 2% to 10% by volume of a solution of sulfuric acid and boric acid, said sulfuric acid being from 60% to 80% in concentration and said boric acid from 0.5% to 40% in concentration, said treatment taking place at a temperature between —10° C. and 30° C. but sufficiently low to avoid adding any appreciable permanent color to said hydrocarbon due to the strength of said acid, and removing residual acid from said methyl styrene cut.

7. A process for preparing a refined indene cut which comprises subjecting light oil produced in the manufacture of artificial gas to fractional distillation to obtain a cut the preponderate part of which boils between 177° C. and 186° C., treating said cut with from 2% to 10% by volume of a solution of sulfuric acid and boric acid, said sulfuric acid being from 60% to 80% in concentration, and said boric acid from 0.5% to 40% in concentration, said treatment taking place at a temperature between —10° C. and 30° C. but sufficiently low to avoid adding any appreciable permanent color to said hydrocarbon due to the strength of said acid, and removing residual acid from said indene cut.

FRANK J. SODAY.